US012800780B2

(12) United States Patent
Peng et al.

(10) Patent No.: US 12,800,780 B2
(45) Date of Patent: Nov. 17, 2026

(54) METHOD AND APPARATUS FOR DETERMINING TIME OF FLIGHT AND DEPTH OF INTERACTION USING A POSITRON EMISSION TOMOGRAPHY SYSTEM

(71) Applicant: Canon Kabushiki Kaisha, Tokyo (JP)

(72) Inventors: Peng Peng, Vernon Hills, IL (US); Yi Qiang, Vernon Hills, IL (US); Wenyuan Qi, Vernon Hills, IL (US); Xiaoli Li, Vernon Hills, IL (US); Kent Burr, Vernon Hills, IL (US)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 18/415,012

(22) Filed: Jan. 17, 2024

(65) Prior Publication Data

US 2025/0231305 A1 Jul. 17, 2025

(51) Int. Cl.

*G01T 1/29* (2006.01)
*G01T 1/20* (2006.01)
*G01T 1/202* (2006.01)

(52) U.S. Cl.

CPC .......... *G01T 1/2985* (2013.01); *G01T 1/2002* (2013.01); *G01T 1/20183* (2020.05); *G01T 1/202* (2013.01)

(58) Field of Classification Search

CPC . G01T 1/2985; G01T 1/2002; G01T 1/20183; G01T 1/202

See application file for complete search history.

(56) References Cited

U.S. PATENT DOCUMENTS 5,576,546 A * 11/1996 Gagnon ................ G01T 1/1642 250/369
9,040,924 B2 * 5/2015 Lewellen ................ G01T 1/202 250/361 R
9,442,198 B2 9/2016 Lewellen et al.
9,696,439 B2 * 7/2017 An ........................ G01T 1/2985
(Continued)

OTHER PUBLICATIONS

Kuang et al. ; A depth-encoding PET detector that uses light sharing and single-ended readout with silicon photomultipliers ; Physics in Medicine & Biology 63 ; Feb. 13, 2018 ; 11 Pages.
(Continued)

*Primary Examiner* — Casey Bryant
(74) *Attorney, Agent, or Firm* — Oblon, McClelland, Maier & Neustadt, L.L.P.

(57) ABSTRACT

A PET apparatus includes a detector block including a miniblock including detector crystals, a first detector crystal and a second detector crystal being separated by an inner reflector, the inner reflector having a depth-dependent transparency, a first photosensor configured to detect light from a gamma ray detection event, and a second photosensor configured to detect the light from the gamma ray detection event, a first intensity and a second intensity of the light detected by the first and second photosensor being dependent on the depth-dependent transparency of the inner reflector; and processing circuitry configured to determine, based on the detected first intensity, a first energy, determine, based on the detected second intensity, a second energy, and determine, based on the first energy and the second energy, a depth of interaction (DOI) of the gamma ray detection event.

19 Claims, 19 Drawing Sheets

(56) References Cited

U.S. PATENT DOCUMENTS

| | | | | |
|---|---|---|---|---|
| 9,864,073 | B1 | 1/2018 | Kim | |
| 10,379,228 | B2 | 8/2019 | Sowards-Emmerd et al. | |
| 11,409,010 | B2 * | 8/2022 | Li | G01T 1/1642 |
| 12,123,988 | B2 * | 10/2024 | Kapusta | G01T 1/2002 |
| 2010/0127178 | A1 * | 5/2010 | Laurence | G01T 1/202<br>250/363.04 |
| 2010/0270463 | A1 * | 10/2010 | Lee | G01T 1/2002<br>250/252.1 |
| 2016/0170043 | A1 * | 6/2016 | Andreaco | G01T 1/2002<br>250/368 |
| 2016/0209517 | A1 * | 7/2016 | Cooke | H10F 39/024 |

OTHER PUBLICATIONS

Miyaoka et al. ; Design of a Depth of Interaction (DOI) PET Detector Module ; IEEE Transactions on Nuclear Science, vol. 45, No. 3 ; Jun. 1998 ; 5 Pages.

* cited by examiner

METHOD AND APPARATUS FOR DETERMINING TIME OF FLIGHT AND DEPTH OF INTERACTION USING A POSITRON EMISSION TOMOGRAPHY SYSTEM

FIELD

This disclosure relates to a method and apparatus for using depth of interaction data obtained via a detector having reflectors in a PET scanner.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Positron emission tomography (PET) is a functional imaging modality that is capable of imaging biochemical processes in humans or animals through the use of radioactive tracers. In PET imaging, a tracer agent is introduced into the patient to be imaged via injection, inhalation, or ingestion. After administration, the physical and bio-molecular properties of the agent cause it to concentrate at specific locations in the patient's body. The actual spatial distribution of the agent, the intensity of the region of accumulation of the agent, and the kinetics of the process from administration to its eventual elimination are all factors that may have clinical significance.

During this process, a tracer attached to the agent will emit positrons. When an emitted positron collides with an electron, an annihilation event occurs, wherein the positron and electron are combined. An annihilation event produces two gamma rays (at 511 keV) traveling at substantially 180 degrees apart. TOF (time of flight) and DOI (depth of interaction) are two metrics used to evaluate the performance of a PET scanner. One methodology can be used over the other based on different applications, but can require the use of multiple PET detectors. PET detectors are a costly component of a whole-body (or total-body) PET system. Thus, a detector that can measure both TOF and DOI without adding complicated components or construction/assembly processes to ordinary TOF detectors is desired.

SUMMARY

The present disclosure relates to a PET apparatus, including a detector block including a miniblock including a plurality of detector crystals, a first detector crystal and a second detector crystal of the plurality of detector crystals being separated by an inner reflector, the inner reflector having a depth-dependent transparency, a first photosensor configured to detect light from a gamma ray detection event, a first intensity of the light detected by the first photosensor being dependent on the depth-dependent transparency of the inner reflector, and a second photosensor configured to detect the light from the gamma ray detection event, a second intensity of the light detected by the second photosensor being dependent on the depth-dependent transparency of the inner reflector; and processing circuitry configured to determine, based on the detected first intensity, a first energy, determine, based on the detected second intensity, a second energy, and determine, based on the first energy and the second energy, a depth of interaction (DOI) of the gamma ray detection event.

The disclosure additionally relates to method, including detecting, via a first photosensor in a detector block including a miniblock having a plurality of detector crystals, a first detector crystal and a second detector crystal of the plurality of detector crystals being separated by an inner reflector, the inner reflector having a depth-dependent transparency, a first intensity of light from a gamma ray detection event incident on the first detector crystal; detecting, via a second photosensor in the detector block, a second intensity of light from the gamma ray detection event incident on the second detector crystal; determining, based on the detected first intensity of the light, a first energy; determining, based on the detected second intensity of the light, a second energy; and determining, based on the first energy and the second energy, a DOI of the gamma ray detection event, wherein the first intensity of the light is determined by the depth-dependent transparency of the inner reflector, and the second intensity of the light is determined by the depth-dependent transparency of the inner reflector.

Note that this summary section does not specify every embodiment and/or incrementally novel aspect of the present disclosure or claimed invention. Instead, this summary only provides a preliminary discussion of different embodiments. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
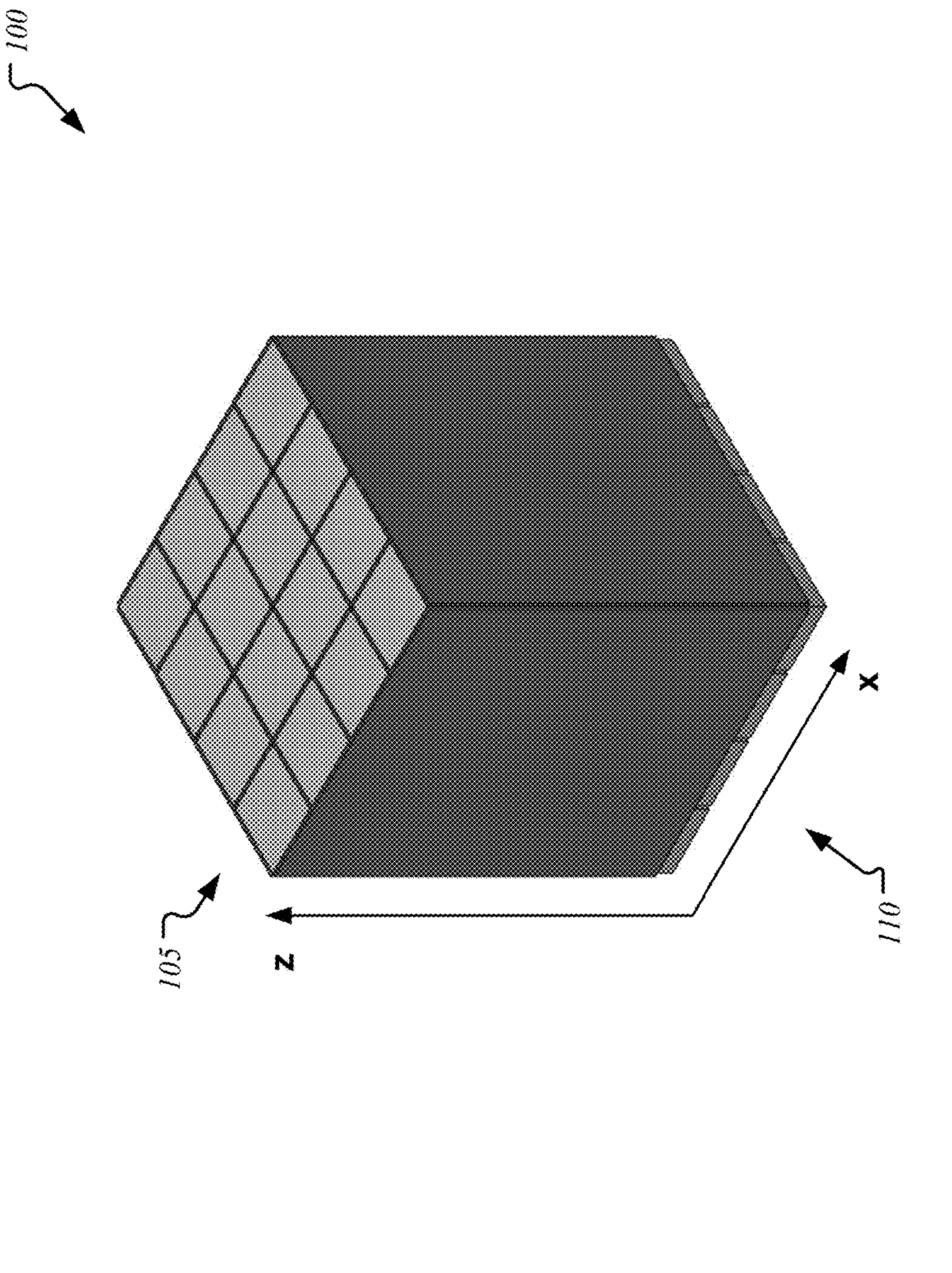
FIG. 1 shows a PET detector with a pixelated array of crystals coupled to a pixelated array of photosensors, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as “top,” “bottom,” “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The system may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

In short axial field of view (AFOV), whole-body positron emission tomography (PET) scanner, time of flight (TOF) is more important than depth of interaction (DOI) since TOF will improve the system’s effective sensitivity, which has been shown to enable better image quality, lower scan time, and lower radiation dose administrated to patients. On the other hand, DOI information enables better image spatial resolution by correcting any parallax errors, which is important in PET scanners with a small bore diameter (e.g., for brain imaging) or a large axial acceptance angle (such as long-AFOV, total-body scanners).

Furthermore, measuring DOI can also improve TOF resolution. Thus, a detector that can measure both TOF and DOI, preferably simultaneously, is desired.

In the use of total-body PET scanners (e.g., with a very long AFOV), DOI becomes more important to correct the error caused by a very oblique line of response along an axial direction. Therefore, a PET scanner with both good TOF resolution and DOI information will further improve the performance of the clinical PET scanner. Since PET detectors are a costly component of a whole-body (or total-body) PET system, a detector design capable of measuring both TOF and DOI without adding complex components or construction/assembly processes is also advantageous.

Notably, DOI information can be extracted from PET detectors with particular designs. As described herein, a PET detector design uses reflector shapes, which is particularly advantageous for the implementation due to the lower costs.

One challenge in applying the DOI design from preclinical PET to clinical PET is that, to distinguish the small crystals in a preclinical PET detector, the reflectors are designed to channel the scintillation light from one crystal into several different photosensors to achieve better crystal separation. However, spreading scintillation light among several photosensors decreases the amount of scintillation light on each photosensor, which degrades the TOF resolution due to lower photon statistics on each photosensor and the timing jitter introduced by bigger variation in photon travel distance. As described herein, to maintain good TOF resolution while extracting DOI information for clinical PET scanners, a careful design for the reflector shape can mitigate any reduction of TOF resolution and/or DOI resolution.

To this end, FIG. 1 shows a PET detector 100 with a pixelated array of crystals 105 coupled to a pixelated array of photosensors 110, according to an embodiment of the present disclosure. In one embodiment, the PET detector 100 of FIG. 1 includes a 4×4 array of the crystals 105 arranged (as shown) overtop or on top of the 4×4 array of the photosensors 110 to yield a one-on-one arrangement, and the PET detector 100 is configured to provide a single-ended readout. The photosensor 110 is configured to detect the scintillation light from the corresponding crystal 105, resulting in the best measurement condition for TOF resolution. Notably, reflectors (solid black lines along the top surface) separate each of the crystals 105. Note that the reflectors disposed on a top surface of the crystals 105 is not shown.

Figure 2:
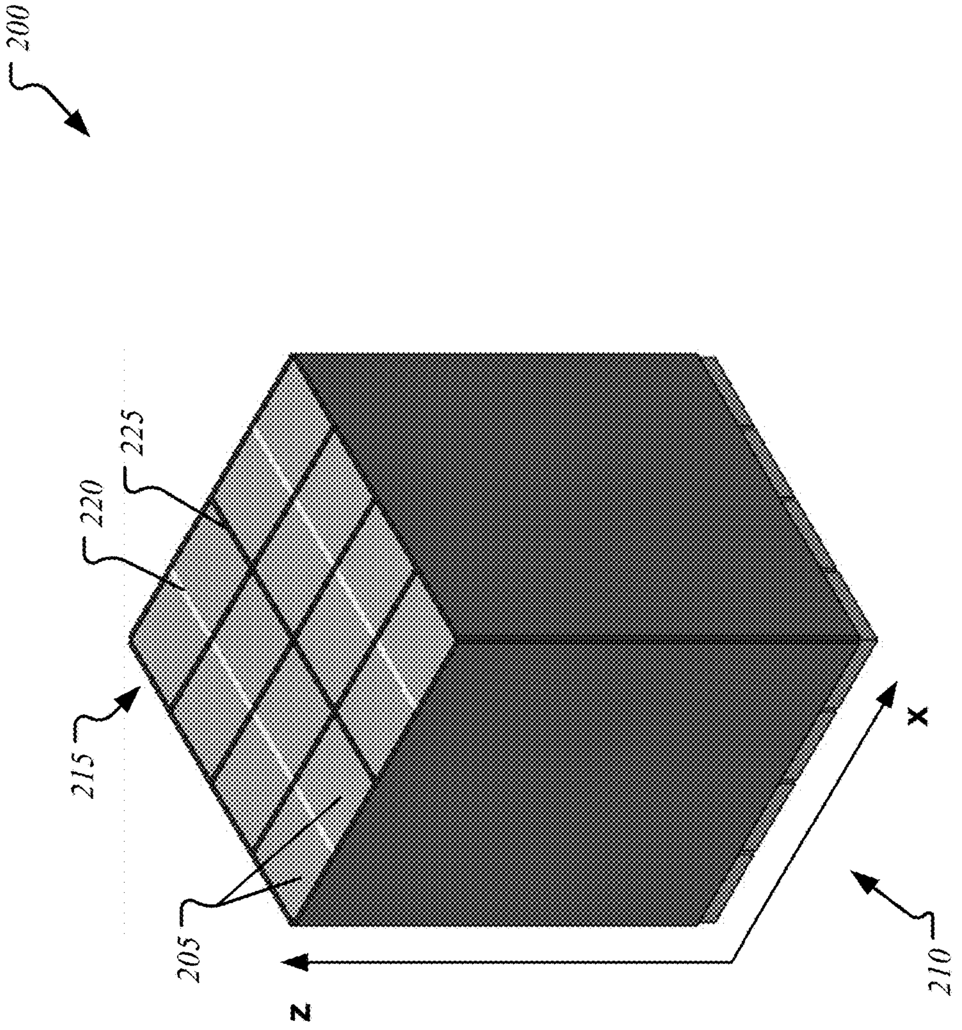
FIG. 2 is a schematic showing a PET detector with a miniblock design, according to an embodiment of the present disclosure.

FIG. 2 is a schematic showing a PET detector 200 with a miniblock design, according to an embodiment of the present disclosure. In an embodiment, the PET detector 200 includes crystals 205 and photosensors 210, but in contrast to the PET detector 100 of FIG. 1, the crystals 205 are grouped together to form miniblocks 215 having two of the crystals 205 per miniblock 215. Thus, each of the PET detector 200 includes a 2×4 array of the miniblocks 215. Here, each of the miniblocks 215 includes two different kinds of reflectors: inner reflectors 220 and outer reflectors 225.

In one embodiment, the inner reflectors 220 separate the crystals 205 within each of the miniblocks 215, which has varying transparency along a z-direction. DOI information with a different light-sharing pattern is encoded within each of the miniblocks 215. The outer reflectors 225 separate the miniblocks 215 in the PET detector 200, which are reflectors configured to prevent light cross talk between the miniblocks 215. Since the scintillation light is confined in each of the miniblocks 215, this ensures high concentration of scintillation light reaching the photosensors 210, which helps maintain higher timing resolution for TOF. Note that the outer reflectors 225 disposed on a top surface of the crystals 205 are not shown, but can be included in the design.

Figure 3:
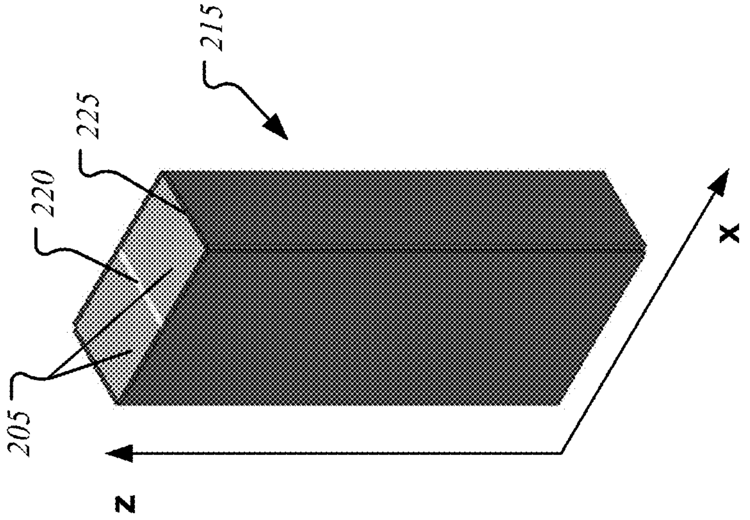
FIG. 3 is a schematic showing the structure of the miniblocks, according to an embodiment of the present disclosure.

FIG. 3 is a schematic showing the structure of the miniblocks 215, according to an embodiment of the present disclosure. In one embodiment, one of the inner reflectors 220 separates two of the crystals 205, five of the outer reflectors 225 cover four sides and a top of the miniblocks 215, and a bottom side of the two crystals 205 couples directly on one of the photosensors 210 for scintillation light detection. The inner reflector 220 between the two crystals 205 is partially transparent for light to share or disperse within the miniblock 215. The outer reflector 225 can have high reflectivity, which prevents light escape or leakage.

Figure 4:
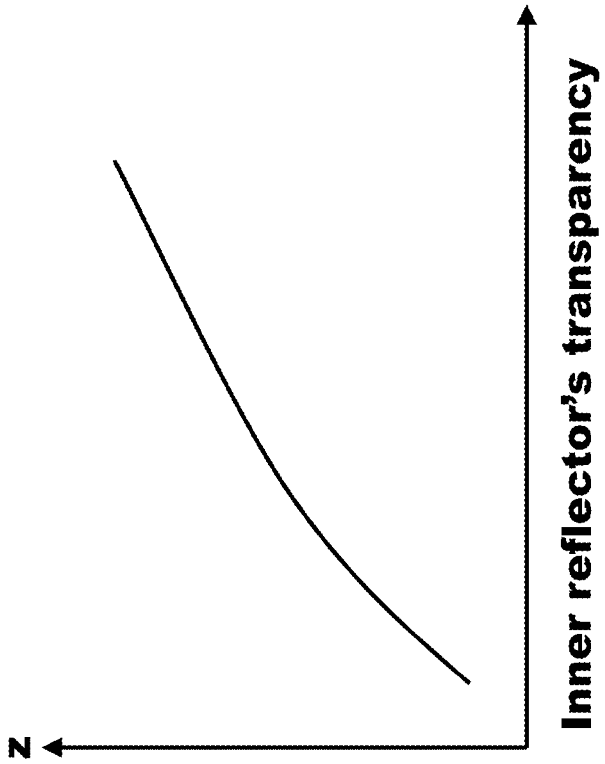
FIG. 4 is a schematic showing transparency of the inner reflector varying based on depth, according to an embodiment of the present disclosure.

FIG. 4 is a schematic showing transparency of the inner reflector 220 varying based on depth, according to an embodiment of the present disclosure. In one embodiment, the transparency for the inner reflector 220 ($T_{inner}$) can vary for different depths of the crystal 205 (z direction). Thus, for a gamma ray hitting the crystal 205 at different depths, the light-sharing pattern within the miniblock 215 will be different, which enables the extraction of DOI information. The curve in FIG. 4 illustrates an example for a relationship between $T_{inner}$ and z, however the relationship can be generalized to any function as $T_{inner}=f(z)$.

Figure 5:
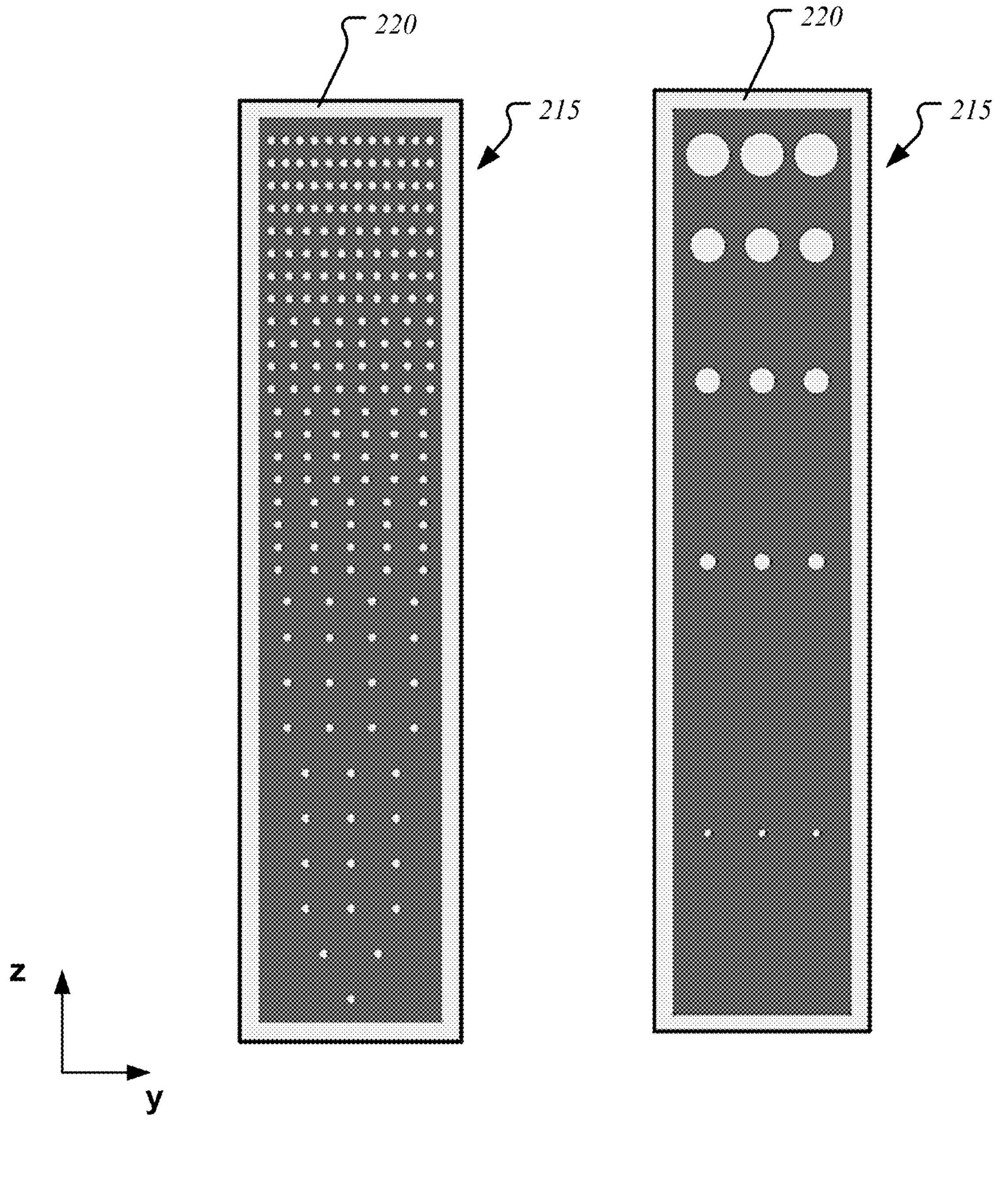
FIG. 5 includes two schematics showing various designs for the inner reflectors in the miniblocks, according to an embodiment of the present disclosure.

FIG. 5 includes two schematics showing various designs for the inner reflectors 220 in the miniblocks 215, according to an embodiment of the present disclosure. In one embodiment, realizing z-dependent transparency on the inner reflector 220 can be achieved by forming different patterns of openings or holes on or through the inner reflector 220. In one example, the left schematic includes different densities of holes having a same size at varying z distances or depths, while the right schematic includes holes having different sizes at varying z distances or depths. In one example, the holes can have different sizes at repeating or consistently spaced z depths. A shape of the holes can be circular, triangular, square, pentagonal, hexagonal, or other n-sided shape, or any combination thereof. In one example, the holes can have a predetermined pattern while providing a target density for a target area. In one example, the holes can have a random pattern while providing a target density for a target area. Although the patterns shown in FIG. 5 have symmetry along the z axis, the pattern can be non-symmetric along the z axis. That is, the density of the holes can vary along the y axis. In one example, for the region of the inner reflector 220 including more holes, there can be more light passing through the inner reflector 220. Concomitantly, for the region of the inner reflector 220 including fewer holes, the transparency can be less. In one embodiment, the holes can be formed or fabricated via mechanical processes such as drilling, scribing, punching, stamping, or the like. Similarly, the inner reflector 220 can be fabricated to exclude material at the desired locations, such as via molding, sintering, other additive manufacturing, or the like. In one embodiment, the holes can be formed via other processes, such as chemical etching, plasma etching, laser etching, lithography, deposition, or the like.

Figure 6A:
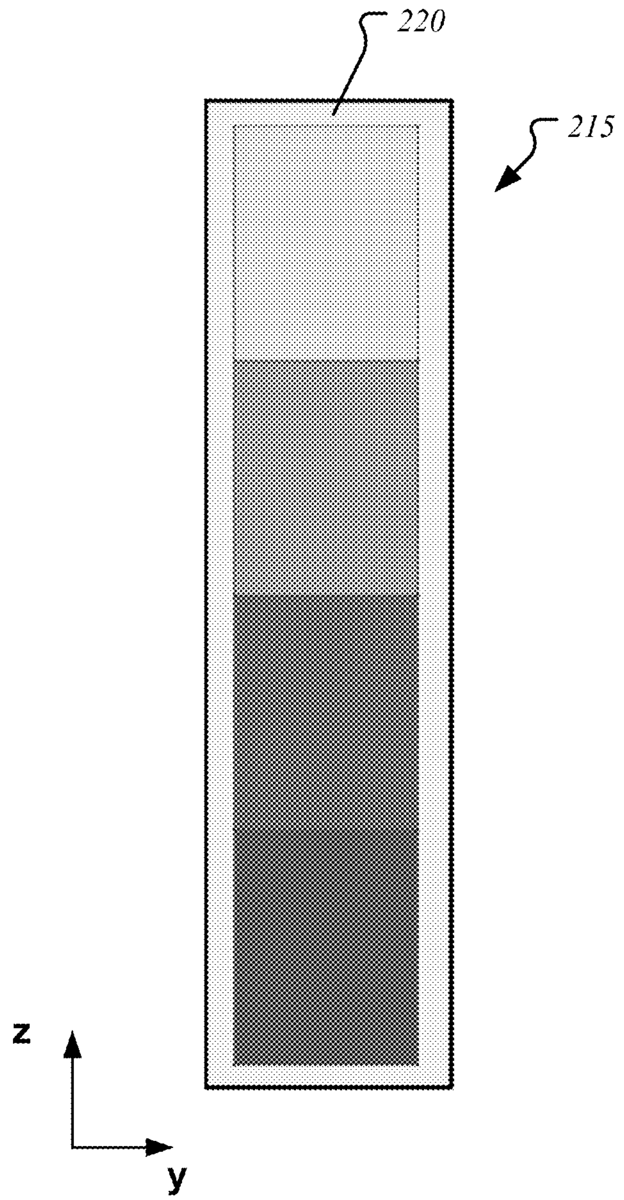
FIG. 6A is a schematic showing varying transparency based on material, according to an embodiment of the present disclosure.

FIG. 6A is a schematic showing varying transparency based on material, according to an embodiment of the present disclosure. In one embodiment, different transparency can be achieved by using different materials along the z direction. As shown in FIG. 6A, which can be considered a cross-section through the inner reflector 220, the inner reflector 220 includes four sections, segments, or portions, which can be generalized to any other number of sections. In one example, the inner reflector 220 includes 2 sections, 3 sections, 5 sections, or generally, n sections. A cross-sectional shape of the sections need not be 4-sided as shown. The shape of the sections can vary and be complementary to one another. In one example, a first section can be convex pentagonal while an adjacent second section can be convex pentagonal. Thus, the portion having the convex and concave parts of the shape can have a transparency that is a composite of the transparency for the two different materials in the first and second sections. In one embodiment, a material can be applied at each of the sections. In one example, a film or paint can be applied to each of the sections, wherein each section's film or paint is a different material. In one example, varying numbers of layers of the film or paint can be applied to each of the sections, wherein each section's film or paint is the same. Similarly, each section's film or paint can be a combination of different materials as well. As shown in FIG. 6A, the top section can have a thin (or high transparency) film applied to facilitate higher transmission of the light, while the bottom section can have a thick (or low transparency) film applied to reduce transmission of the light. A material of the film or paint can be, for example, $BaSO_4$.

Figure 6B:
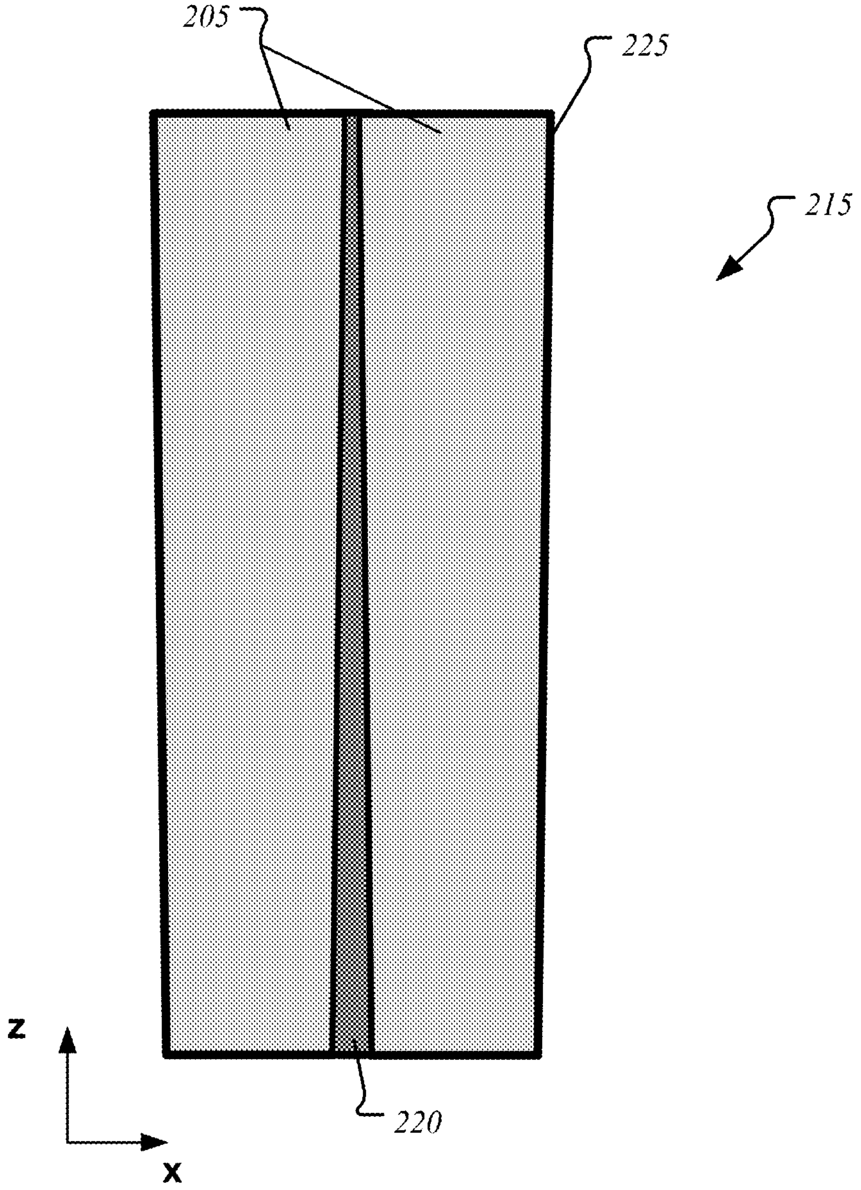
FIG. 6B is a schematic showing that different transparency can be achieved by varying a thickness of the inner reflector 220, according to an embodiment of the present disclosure.

FIG. 6B is a schematic showing that different transparency can be achieved by varying a thickness of the inner reflector 220, according to an embodiment of the present disclosure. In one embodiment, by using the same material, but having a different thickness for the inner reflector 220 along the z direction, the transparency can be modified. Notably, the cross-sectional view shown in FIG. 6B can be orthogonal to the cross-sectional view shown in FIG. 5 and FIG. 6A. As shown in FIG. 6B, the top section can be thin to facilitate higher transmission of the light, while the bottom section can be thicker than the top to reduce transmission of the light. In one embodiment, the material of the inner reflector 220 can be polyester, polypropylene, polyphenylene, para-aromatic polyamide (aramid), or the like.

In one embodiment, the inner reflector 220 can be fabricated or formed separately from the crystals 205 and arranged in between two or more adjacent crystals 205. Additionally or alternatively, the inner reflector 220 can be fabricated or formed as part of the crystals 205. A length (or height) of the crystal 205 and the inner reflectors 220 can be, for example, less than 100 mm, or less than 50 mm, or less than 25 mm, or 20 mm. A width of the crystal 205 and the inner reflectors can be, for example, less than 50 mm, or less than 25 mm, or less than 15 mm, or less than 5 mm. In one example, the crystal 205 is 20 mm long and includes 10 sections, each section having a height of 2 mm. A diameter or width of the holes can be, for example, less than 2 mm, or less than 1 mm, or less than 500 μm, or less than 100 μm, or less than 1 μm. A thickness of the inner reflector 220 at the thinnest section can be less than 5 mm, or less than 1 mm, or less than 500 μm, or less than 100 μm, or less than 500 nm. A thickness of the inner reflector 220 at the thickest section can be less than 15 mm, or less than 10 mm, or less than 5 mm, or less than 1 mm, or less than 100 μm.

It may be appreciated that a combination of the above designs can be used. In one example, a film can be applied to the inner reflector 220 having varying densities of holes formed therein. The film can be applied to all or just a portion of the sections. Similarly, a film can be applied to the inner reflector 220 having varying thickness from a top to a bottom of the inner reflector (along the crystal 205 length). Similarly, a film can be applied to the inner reflector 220 having varying thickness from a top to a bottom of the inner reflector (along the crystal 205 length) while also having varying densities of holes formed therein.

Figure 7:
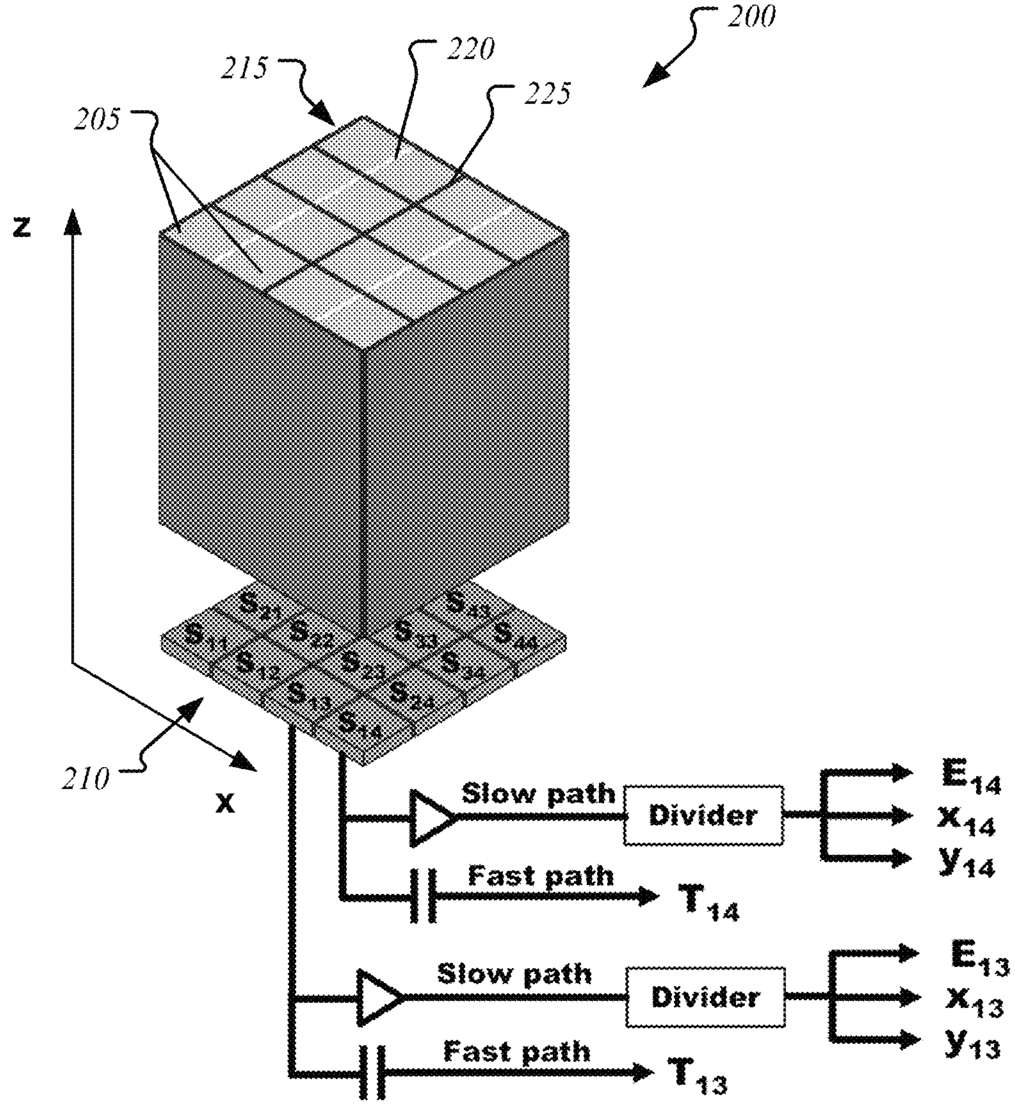
FIG. 7 is a schematic showing an electronic design for processing analog signals from the photosensors, according to an embodiment of the present disclosure.

FIG. 7 is a schematic showing an electronic design for processing analog signals from the photosensors 210, according to an embodiment of the present disclosure. In one embodiment, each signal $S_{ij}$ can be routed into two paths: (i) a slow path which includes a low bandwidth current buffer, then is divided into three signals (E, x, y) for a determination of energy, DOI and position information, and (ii) a fast path which includes a high pass filter (small value capacitor), then goes to form timing information.

Figure 8:
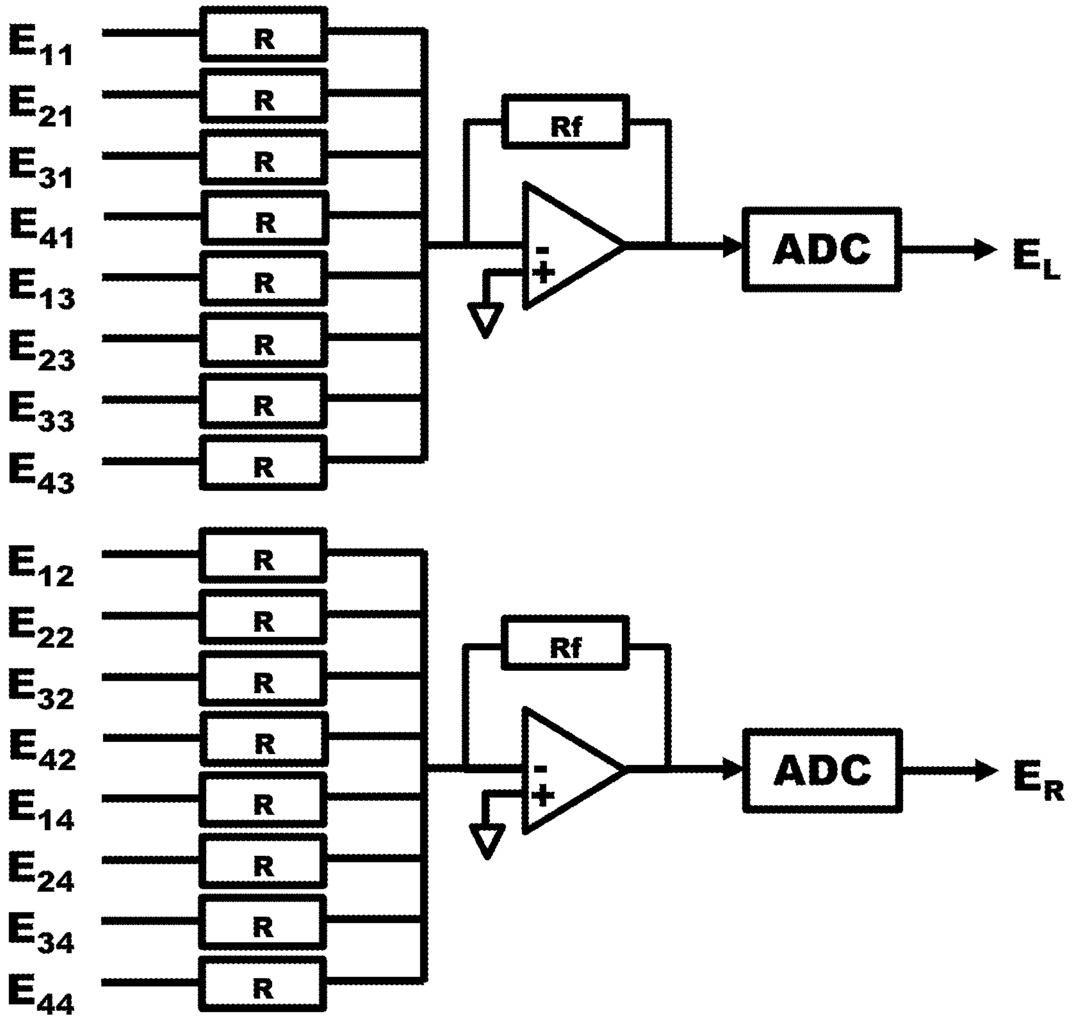
FIG. 8 is a schematic showing the method to determine the energy (E) and decode the DOI information, according to an embodiment of the present disclosure.

FIG. 8 is a schematic showing the method to decode the DOI information, according to an embodiment of the present disclosure. In one embodiment, for gamma rays hitting the crystal 205 at different depths, the light sharing between the crystals 205 in the odd rows (the left crystals 205 in the miniblocks 215) and even rows (the right crystals 205 in the miniblocks 215) is different, thus the ratio of the energy collected in the odd rows and even rows can be used to decode the DOI information. Notably, energy signals from the odd and even rows of the photosensors 210 are summed in two analog-to-digital converters (ADCs), respectively. The ratio between $E_L$ and $E_R$ can provide the figure of merit to decode the DOI information. The sum of $E_L$ and $E_R$ can provide the total energy E for the scintillation event collected by the photosensors 210: $E=E_L+E_R$.

In one example, the gamma ray can be detected by the miniblock 215 corresponding to the $S_{13}$ and $S_{14}$ photosensors 210, and depending on where the gamma ray hits the $S_{13}$ crystal 205 along the z direction, different amounts of scintillation light will leak through the inner reflector 220 to the $S_{14}$ crystal 205. That is, because the inner reflector 220 transparency is z dependent, the amount of light detected that leaks from one crystal 205 to the other will vary based on the inner reflector 220 transparency along the z direction, which can inform where along the z direction the gamma ray struck. In one example, if the gamma ray hits near the top of the left crystal 205 ($S_{13}$), there will be a similar amount of scintillation light reaching the bottom of these two crystals 205 because the top of the inner reflector 220 is more transparent. Thus, the crystal 205 on the right will have a similar reading and the ratio of $E_L$ to $E_R$ will be close to 1. However, if the gamma ray hits near the bottom of the left crystal 205, then most of scintillation light will be collected by the photosensor 210 corresponding to the left crystal 205 ($S_{13}$) because the inner reflector 220 has a lower transparency towards the bottom, which yields a higher $E_L$. Therefore, depending on the values of $E_R$ and $E_L$, a depth for the gamma ray impact can be determined. For the previously described examples, an assumption is made that one gamma ray is only hitting one of the crystals 205.

Figure 9:
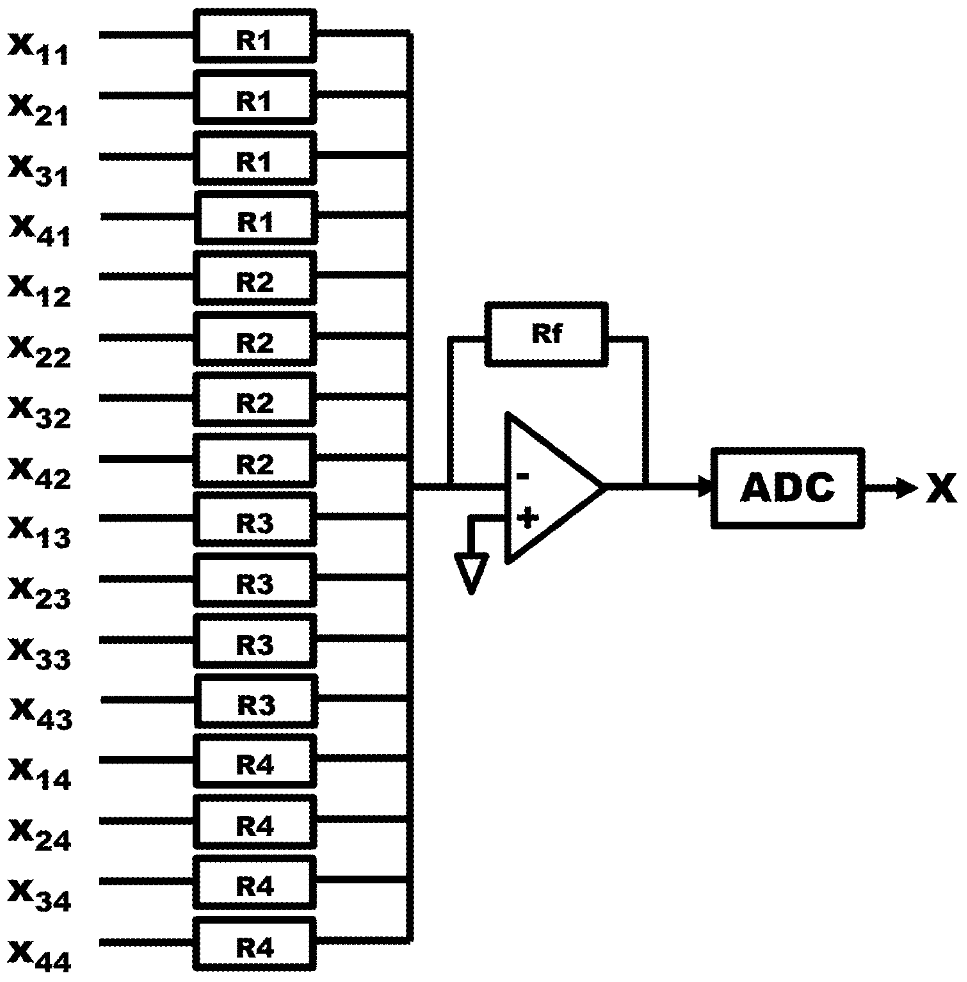
FIG. 9 and FIG. 10 are schematics showing electronics designs for the PET detector for determining position (x, y), according to an embodiment of the present disclosure.
Figure 10:
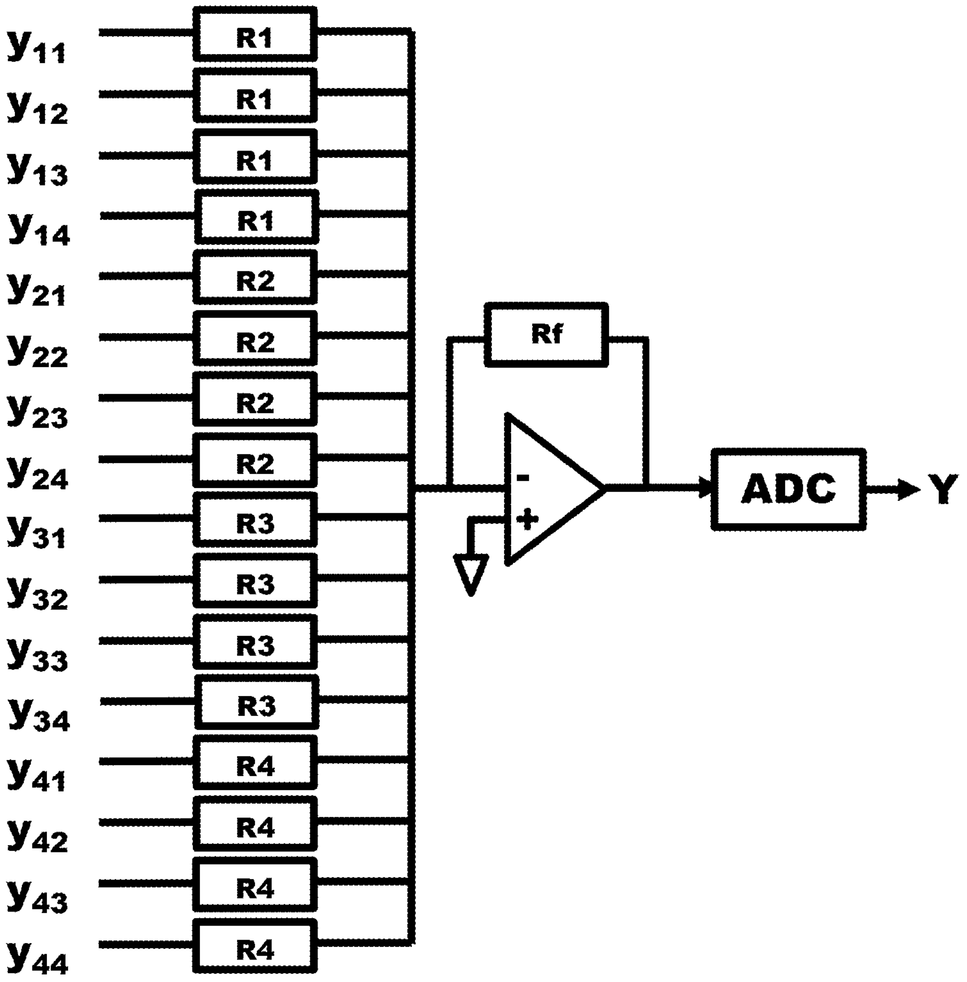

FIG. 9 and FIG. 10 are schematics showing electronics designs for the PET detector 200 for determining position (x, y), according to an embodiment of the present disclosure. In one embodiment, a row and column process can be used to decode a location of the scintillation event. FIG. 9 illustrates decoding an x position of a scintillation event and FIG. 10 illustrates decoding a y position of the scintillation event.

Figure 11:
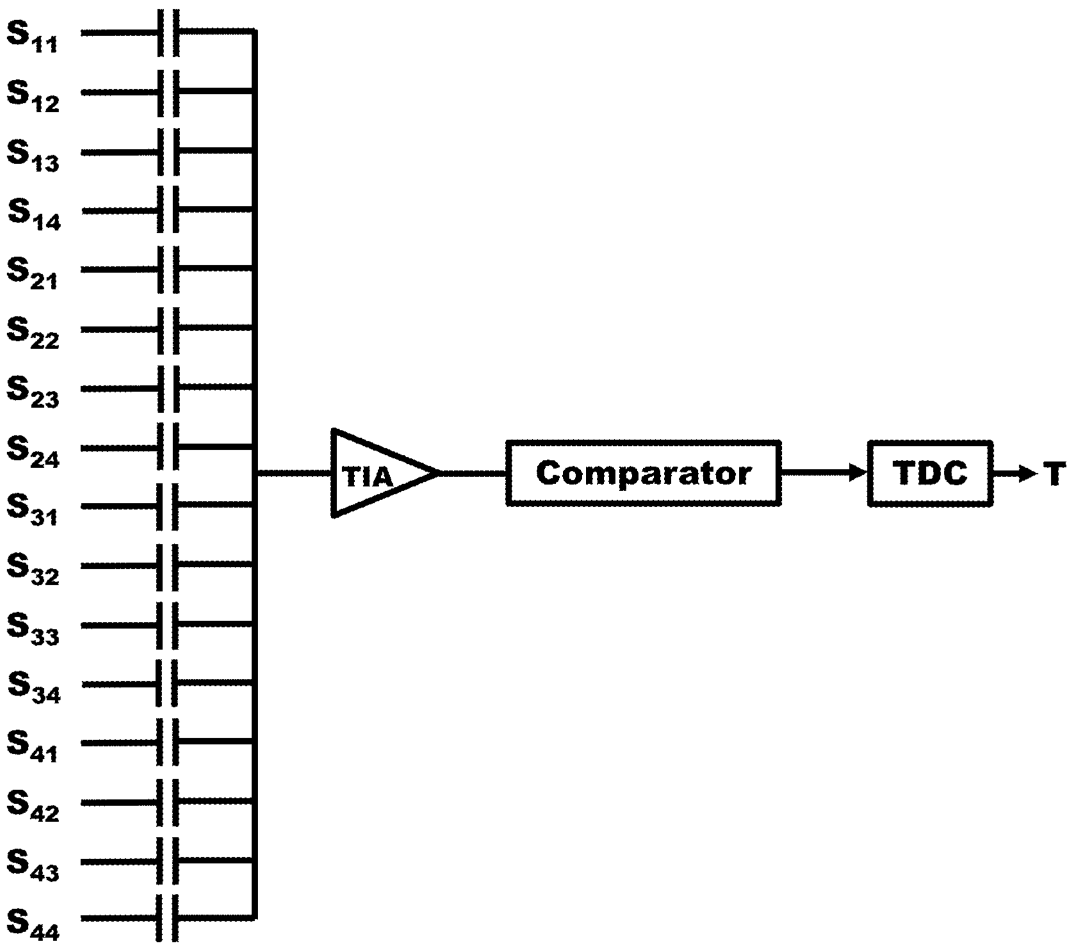
FIG. 11 is a schematic showing an electronic design for a timing path, according to an embodiment of the present disclosure.

FIG. 11 is a schematic showing an electronic design for a timing path, according to an embodiment of the present disclosure. In one embodiment, each analog signal from the photosensors 210 can be processed by a high-pass filter, then combined in the input of one high bandwidth transimpedance amplifier (TIA). The combined timing signal goes into a high-speed comparator and digitized in the time-to-digital converter (TDC). This design of FIG. 11 is the most economical (or least expensive) approach with the least components needed for extracting the timing information, but provides less granular information, such as when there are more than one gamma rays incident on the array of miniblocks 215.

Figure 12:
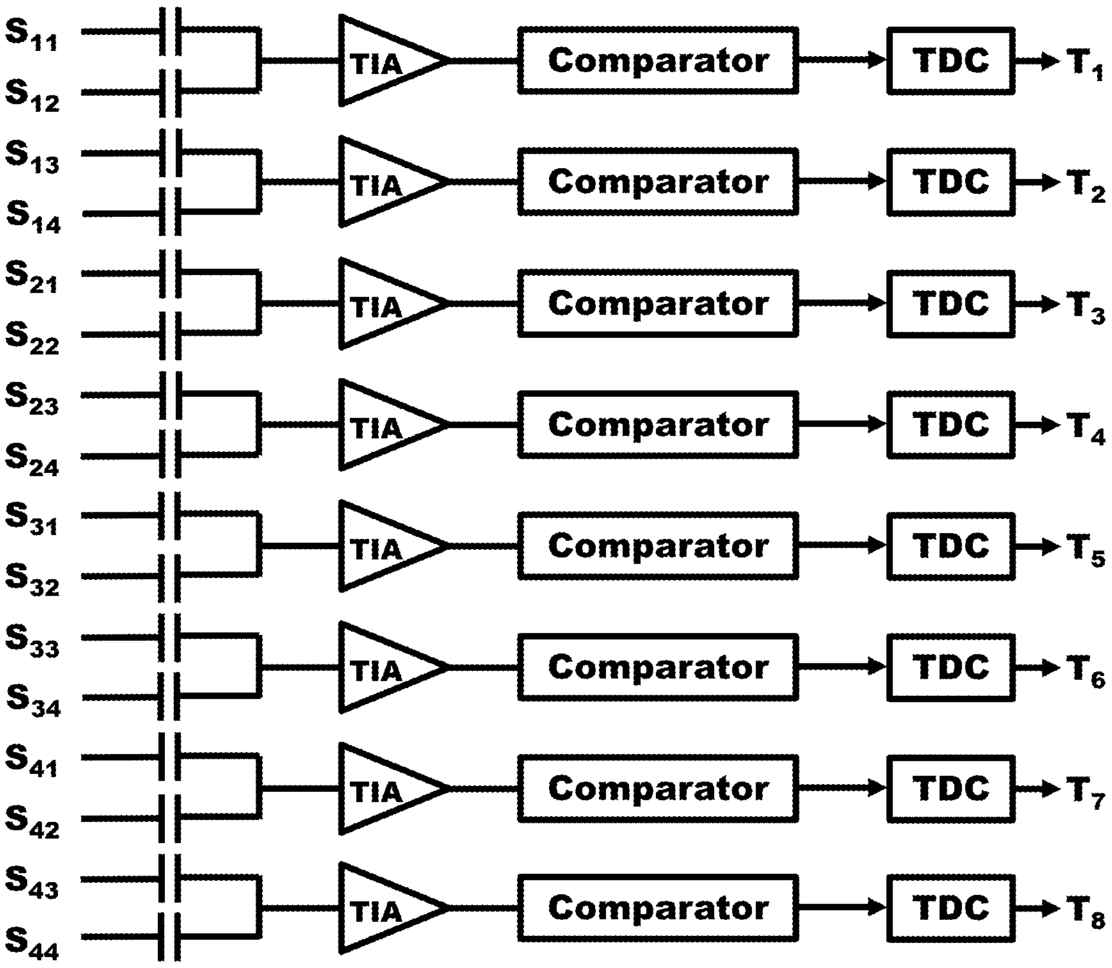
FIG. 12 is a schematic showing an electronic design for a timing path, according to an embodiment of the present disclosure.

FIG. 12 is a schematic showing an electronic design for a timing path, according to an embodiment of the present disclosure. In one embodiment, each of the miniblocks 215 includes a timing path, which needs the most electronic components or is the most expensive. The advantages of this design are: (i) the number of interconnected photosensors 210 is the least, and thus, the effect of a dark count on the timing signal is minimal; (ii) for Compton-scattered events depositing energy in different miniblocks 215, this design will generate several timing signals and this extra information can be used to better estimate the timing of the interaction, and thus can be used to categorize the events into single miniblock 215 events and multiple miniblock 215 events, which can mitigate the degradation caused by Compton-scattered events.

Figure 13:
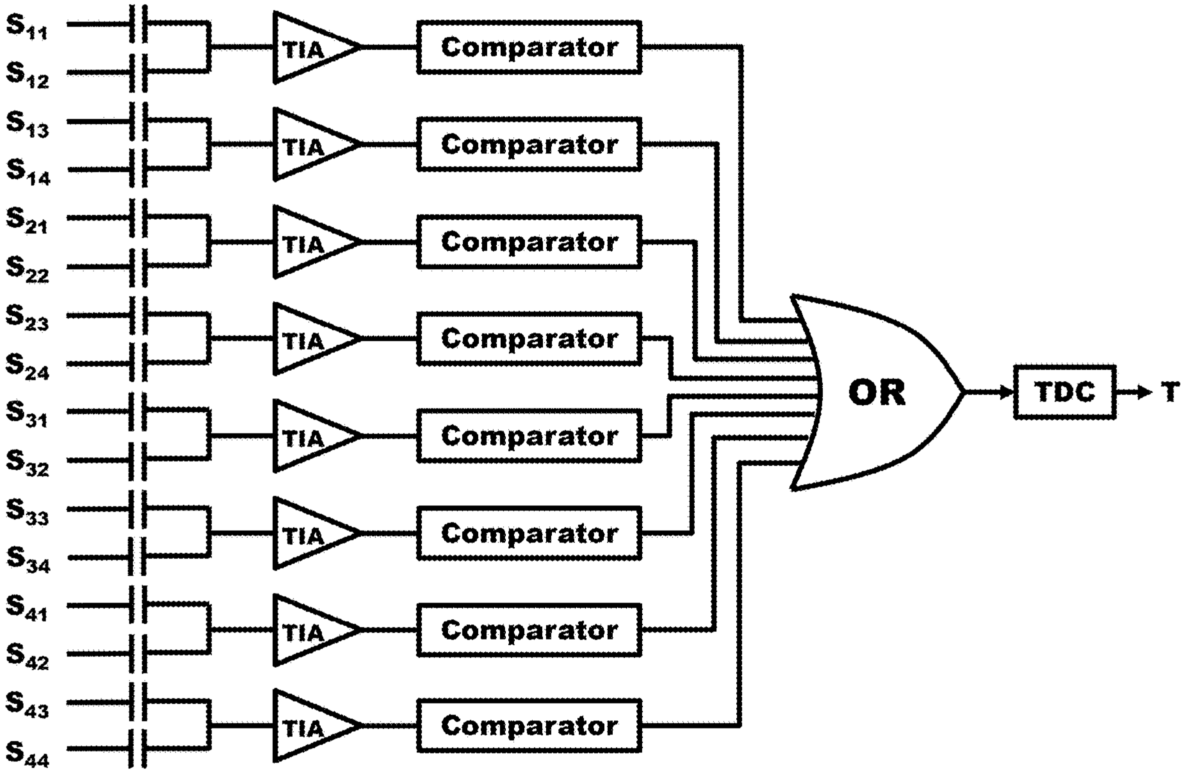
FIG. 13 is a schematic showing an electronic design for a timing path, according to an embodiment of the present disclosure.

FIG. 13 is a schematic showing an electronic design for a timing path, according to an embodiment of the present disclosure. In one embodiment, the shown design for the timing path in FIG. 13 provides a compromise design between the designs of FIG. 11 and FIG. 12. Regarding the cost, the design of FIG. 13 uses fewer TDCs than that of FIG. 12, but more TIAs and comparators than that of FIG. 11. Regarding the performance, the design of FIG. 13 is between the performance of the designs of FIG. 11 and FIG. 12.

Figure 14:
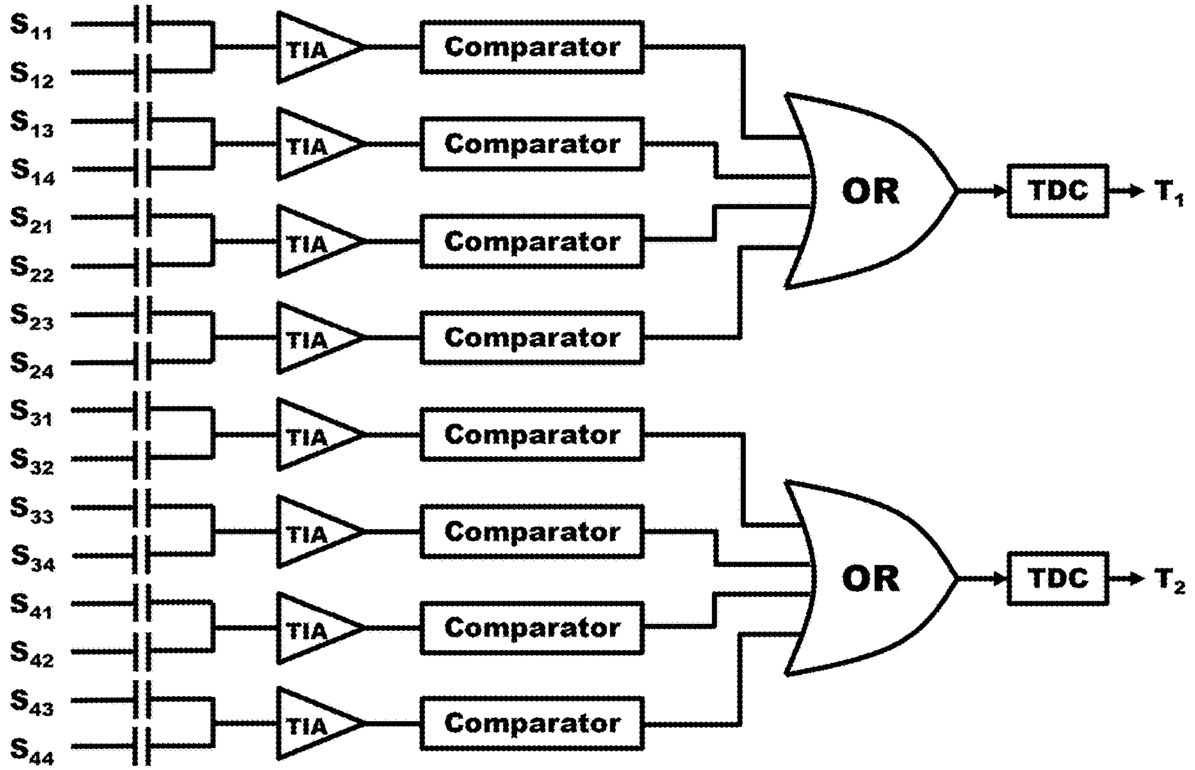
FIG. 14 is a schematic showing an electronic design for a timing path, according to an embodiment of the present disclosure.

FIG. 14 is a schematic showing an electronic design for a timing path, according to an embodiment of the present disclosure. In one embodiment, the shown design for the timing path of FIG. 14 provides another compromise design between the designs of FIG. 11 and FIG. 12. Regarding the cost, the design of FIG. 14 uses more TDCs than the that of FIG. 13, and the number of TDCs used in the design of FIG. 14 can vary between 1 and 8. Regarding the performance, the design of FIG. 14 is between the performance of the designs of FIG. 12 and FIG. 13.

Figure 15A:
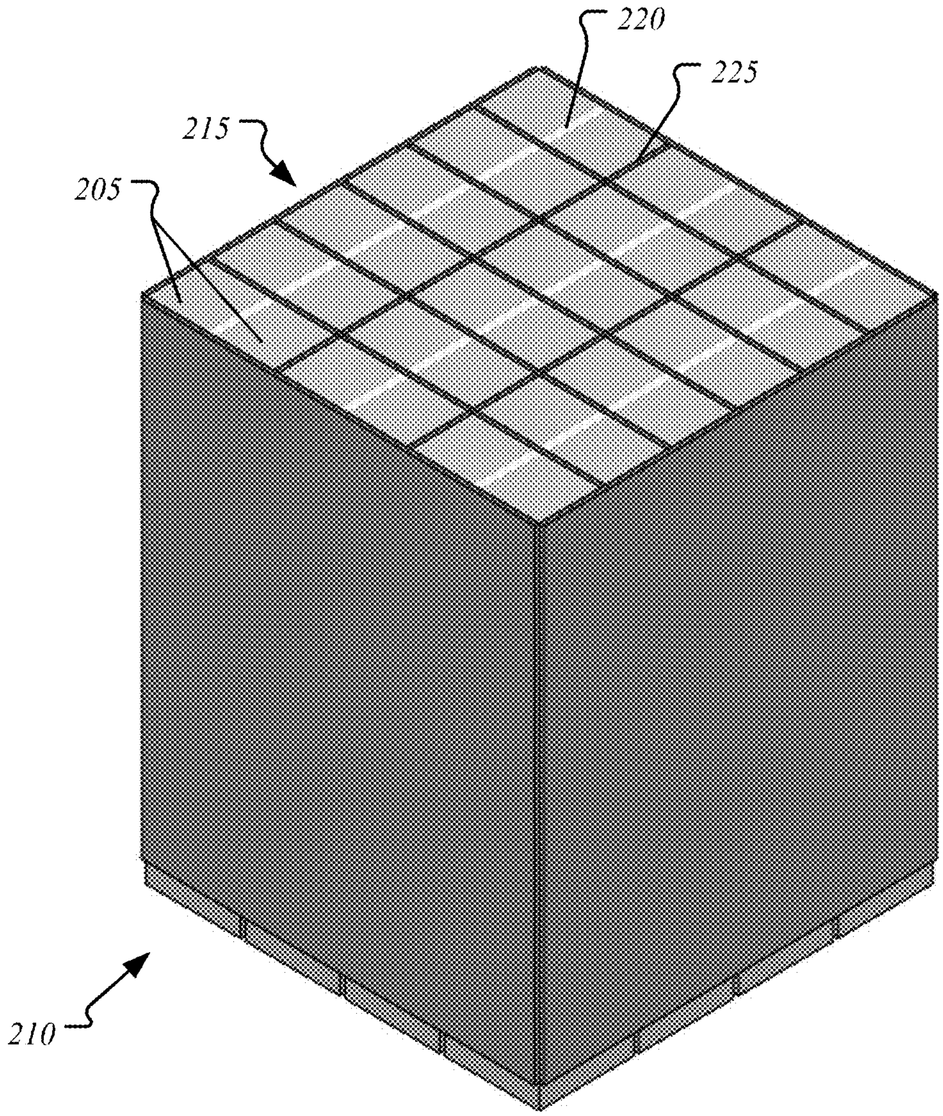
FIG. 15A and FIG. 15B are schematics showing non-one-to-one designs with smaller crystal 205 pitch size, according to an embodiment of the present disclosure.
Figure 15B:
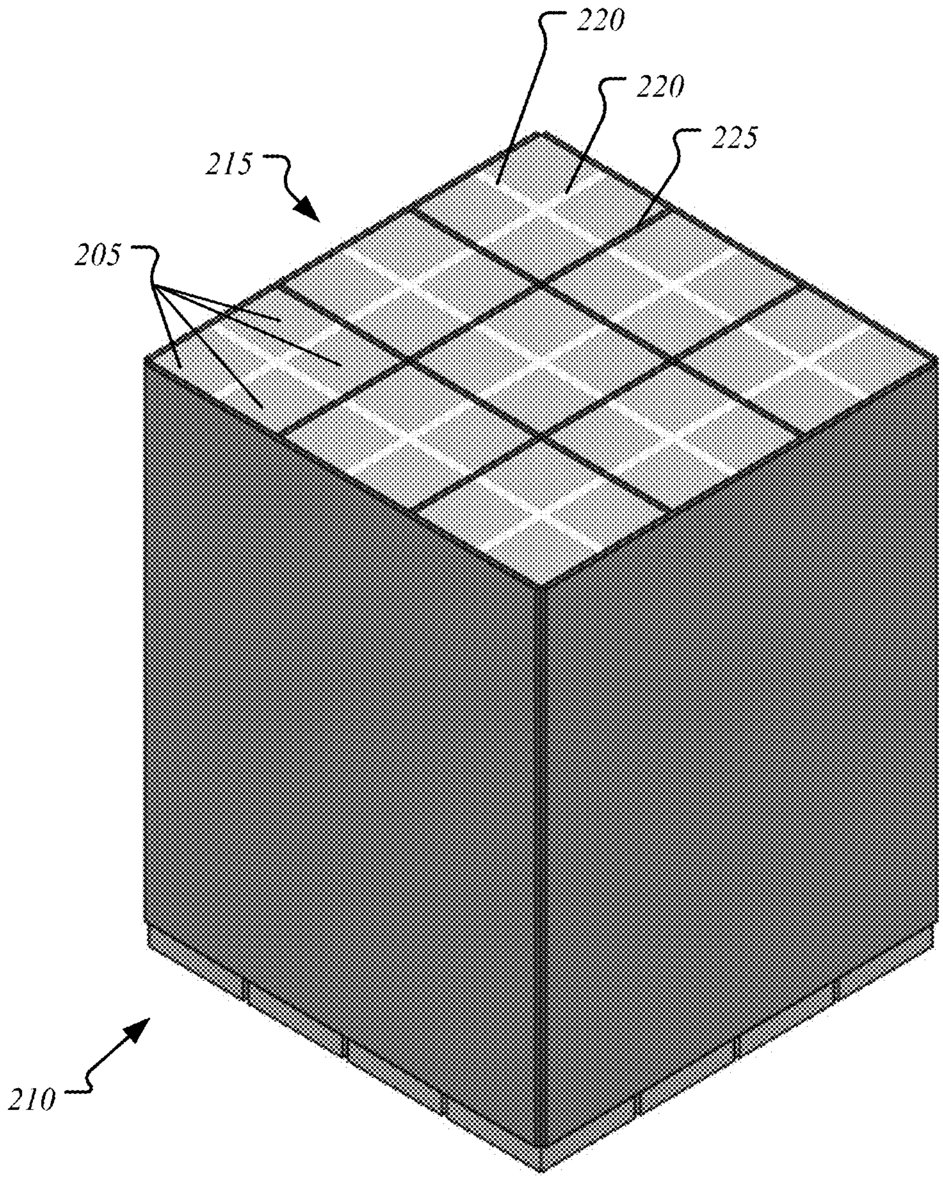

FIG. 15A and FIG. 15B are schematics showing non-one-to-one designs with smaller crystal 205 pitch size, according to an embodiment of the present disclosure. In one embodiment, FIG. 15A illustrates a design including a 6×6 array of the crystals 205 that is attached to a 4×4 array of the photosensors 210. The 6×6 array of the crystals 205 can be divided into 3×6 miniblocks 215, with each of the miniblocks 215 comprising 2×1 of the crystals 205 being divided by one of the inner reflector 220. Thus, light-sharing occurs. In one embodiment, FIG. 15B illustrates a design including a 6×6 array of the crystals 205 that is attached to a 4×4 array of the photosensors 210. Here, a 6×6 array of the crystals 205 can be divided into 3×3 miniblocks 215, with each of the miniblocks 215 comprising 2×2 of the crystals 205 being divided by two of the inner reflectors 220 that are orthogonal to one another (as shown).

Figure 16:
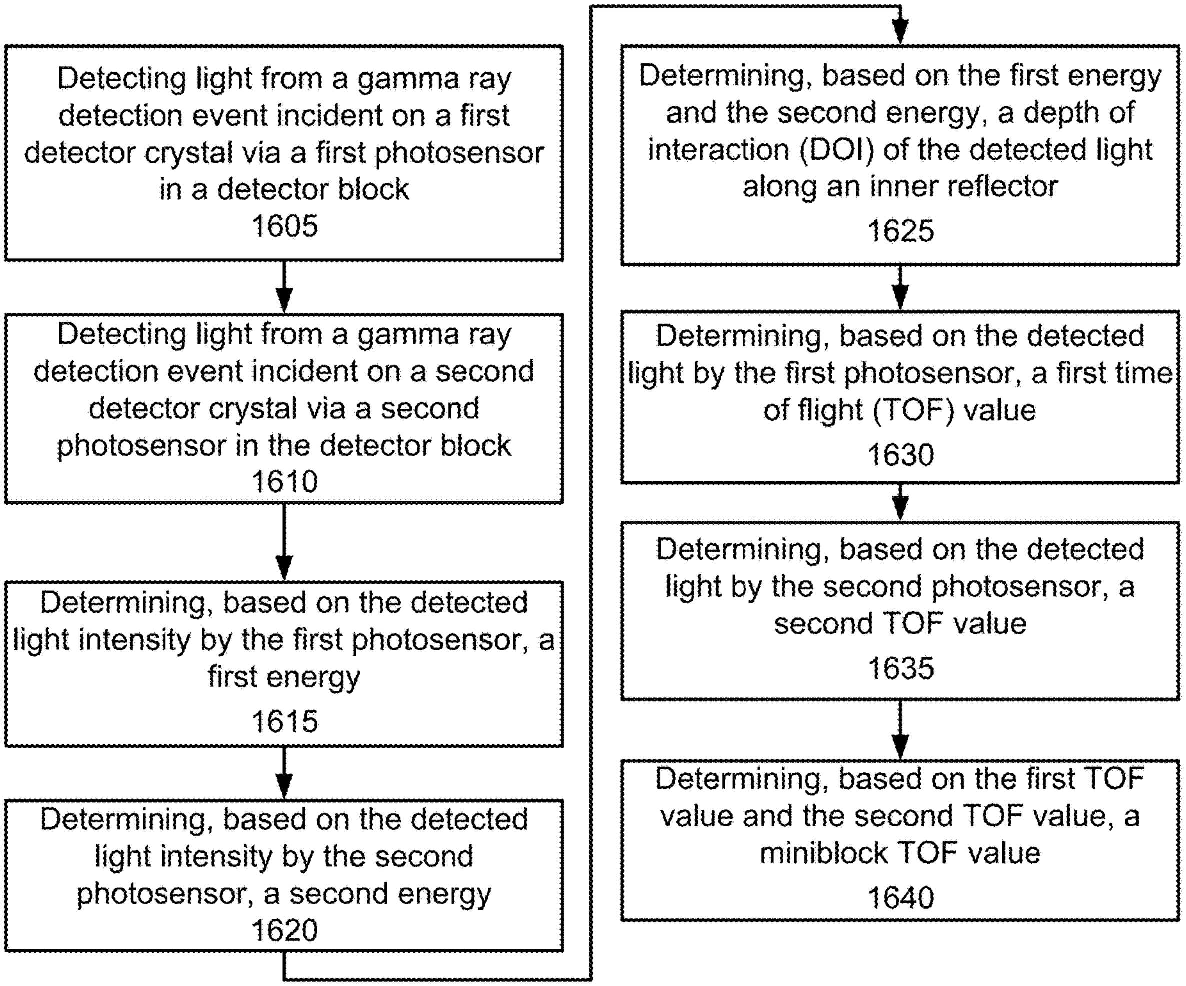
FIG. 16 shows a non-limiting example of a flow chart for a method of determining DOI and TOF, according to an embodiment of the present disclosure.

FIG. 16 shows a non-limiting example of a flow chart for a method of determining DOI and TOF, according to an embodiment of the present disclosure.

In one embodiment, step 1605 is detecting, via a first photosensor in a detector block including a miniblock having a plurality of detector crystals, a first detector crystal and a second detector crystal of the plurality of detector crystals being separated by an inner reflector, the inner reflector having a varying transparency, light from a gamma ray detection event incident on the first (or the second) detector crystal.

In one embodiment, step 1610 is detecting, via a second photosensor in the detector block, light from the gamma ray detection event incident on the first or the second detector crystal.

In one embodiment, step 1615 is determining, based on the detected light intensity by the first photosensor, a first energy.

In one embodiment, step 1620 is determining, based on the detected light intensity by the second photosensor, a second energy.

In one embodiment, step 1625 is determining, based on the first energy and the second energy, the DOI of the detected light along the inner reflector.

In one embodiment, step 1630 is determining, based on the detected light by the first photosensor, a first TOF.

In one embodiment, step 1635 is determining, based on the detected light by the second photosensor, a second TOF.

In one embodiment, step 1640 is determining, based on the first TOF and the second TOF, a miniblock TOF.

Figure 17A:
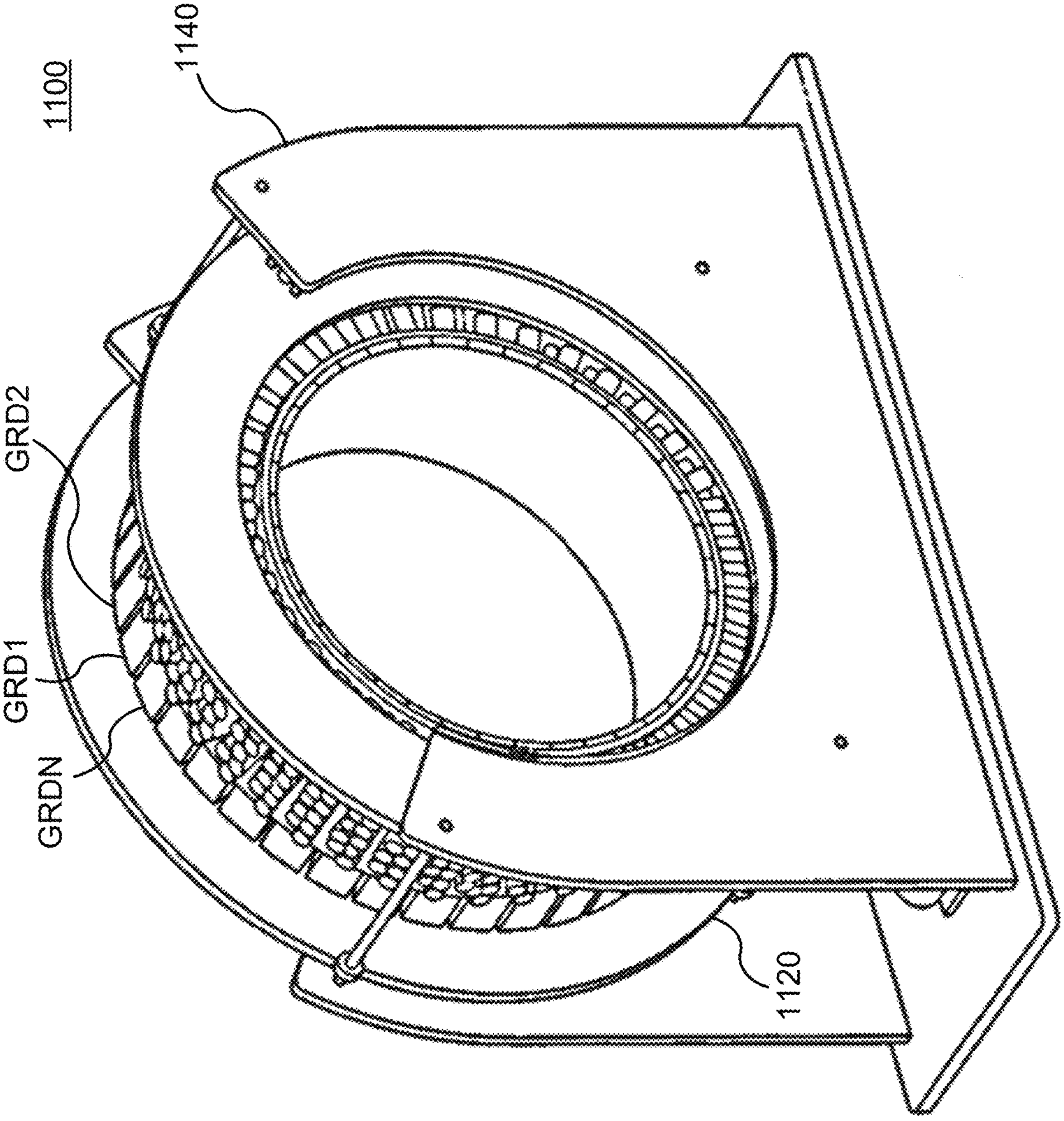
FIG. 17A shows a perspective view of a PET scanner that can be used with the techniques described herein.
Figure 17B:
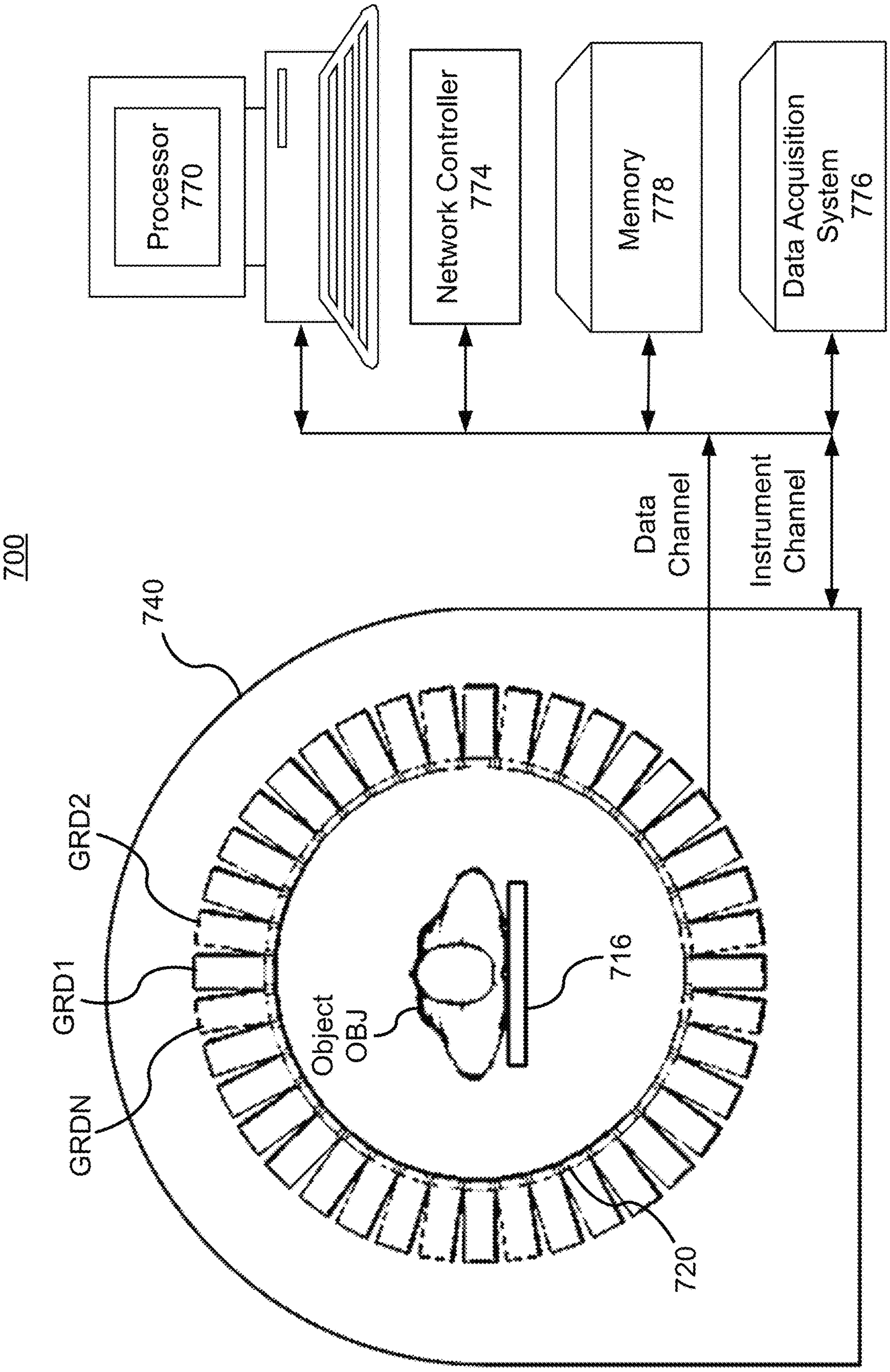
FIG. 17B shows a schematic view of a PET scanner that can be used with the techniques described herein.

FIG. 17A and FIG. 17B show a non-limiting example of a PET scanner 700 that can implement the method 300. The PET scanner 700 includes a number of gamma-ray detectors (GRDs) (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 700.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array of silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 17B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIG. 17A and FIG. 17B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 17B shows an example of the arrangement of the PET scanner 700, in which the object OBJ to be imaged rests on a table 716 and the GRD modules GRD1 through GRDN are arranged circumferentially around the object OBJ and the table 716. The GRDs can be fixedly connected to a circular component 720 that is fixedly connected to the gantry 740. The gantry 740 houses many parts of the PET imager. The gantry 740 of the PET imager also includes an open aperture through which the object OBJ and the table 716 can pass, and gamma-rays emitted in opposite directions from the object OBJ due to an annihilation event can be detected by the GRDs and timing and energy information can be used to determine coincidences for gamma-ray pairs.

In FIG. 17B, circuitry and hardware is also shown for acquiring, storing, processing, and distributing gamma-ray detection data. The circuitry and hardware include: a processor 770, a network controller 774, a memory 778, and a data acquisition system (DAS) 776. The PET imager also includes a data channel that routes detection measurement results from the GRDs to the DAS 776, the processor 770, the memory 778, and the network controller 774. The DAS 776 can control the acquisition, digitization, and routing of the detection data from the detectors. In one implementation, the DAS 776 controls the movement of the bed 716. The processor 770 performs functions including reconstructing images from the detection data, pre-reconstruction processing of the detection data, and post-reconstruction processing of the image data, as discussed herein.

The processor 770 can be configured to perform various steps of methods 100 and/or 200 described herein and variations thereof. The processor 770 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 770 can execute a computer program including a set of computer-readable instructions that perform various steps of method 100 and/or method 200, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 778 can be a hard disk drive, CD-ROM drive, DVD drive, FLASH drive, RAM, ROM or any other electronic storage known in the art.

The network controller 774, such as an Intel Ethernet PRO network interface card from Intel Corporation of America, can interface between the various parts of the PET imager. Additionally, the network controller 774 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) An PET apparatus, including: a detector block including a miniblock including a plurality of detector crystals, a first detector crystal and a second detector crystal of the plurality of detector crystals being separated by an inner reflector, the inner reflector having a depth-dependent transparency, a first photosensor configured to detect light from a gamma ray detection event, a first intensity of the light detected by the first photosensor being dependent on the depth-dependent transparency of the inner reflector, and a second photosensor configured to detect the light from the gamma ray detection event, a second intensity of the light detected by the second photosensor being dependent on the depth-dependent transparency of the inner reflector; and processing circuitry configured to determine, based on the detected first intensity, a first energy, determine, based on the detected second intensity, a second energy, and determine, based on the first energy and the second energy, a depth of interaction (DOI) of the gamma ray detection event.

(2) The apparatus of (1), wherein the inner reflector includes a plurality of openings, the depth-dependent transparency of the inner reflector being determined by the plurality of openings.

(3) The apparatus of either (1) or (2), wherein the plurality of openings is divided into at least two sections along the inner reflector, a first section of the at least two sections having a different density of the plurality of openings compared to a second section of the at least two sections.

(4) The apparatus of any one of (1) to (3), wherein the first section of the at least two sections is disposed towards a top of the inner reflector, the top of the inner reflector being disposed opposite a bottom of the inner reflector, the bottom of the inner reflector being disposed proximal to the first photosensor or the second photosensor, the density of the plurality of openings of the first section of the at least two sections being higher than the density of the plurality of openings of the second section of the at least two sections.

(5) The apparatus of any one of (1) to (4), wherein an opening size for each opening of the plurality of openings is identical.

(6) The apparatus of any one of (1) to (5), wherein the plurality of openings is divided into at least two sections along the inner reflector, a first section of the at least two sections having a different opening size for each opening of the plurality of openings compared to a second section of the at least two sections.

(7) The apparatus of any one of (1) to (6), wherein the opening size for the each opening of the plurality of openings in the first section of the at least two sections is greater than the opening size for the each opening of the plurality of openings in the second section of the at least two sections.

(8) The apparatus of any one of (1) to (7), wherein a number of the plurality of openings in the first section of the at least two sections is identical to a number of the plurality of openings in the second section of the at least two sections.

(9) The apparatus of any one of (1) to (8), wherein the inner reflector includes a first section having a first uniform transparency and a second section having a second uniform transparency.

(10) The apparatus of any one of (1) to (9), wherein the first uniform transparency is determined by a film applied to the first section of the inner reflector and the second uniform transparency is based on a second film applied to the second section of the inner reflector.

(11) The apparatus of any one of (1) to (10), wherein the first section is disposed towards a top of the inner reflector, the top of the inner reflector being disposed opposite a bottom of the inner reflector, the second section being disposed towards the bottom of the inner reflector, the bottom of the inner reflector being disposed proximal to the first photosensor or the second photosensor, the first uniform transparency being higher than the second uniform transparency.

(12) The apparatus of any one of (1) to (11), wherein the first uniform transparency is determined by a thickness of the first section of the inner reflector and the second uniform transparency is determined by a thickness of the second section of the inner reflector.

(13) The apparatus of any one of (1) to (12), wherein the inner reflector includes a top and a bottom, the top of the inner reflector being disposed opposite the bottom of the inner reflector, the bottom of the inner reflector being disposed proximal to the first photosensor or the second photosensor, and a thickness of the inner reflector increases from the top of the inner reflector to the bottom of the inner reflector, the depth-dependent transparency being determined by the thickness of the inner reflector.

(14) The apparatus of any one of (1) to (13), wherein the processing circuitry is further configured to determine the DOI based on a ratio of the first energy to the second energy.

(15) The apparatus of any one of (1) to (14), wherein the processing circuitry is further configured to: determine, based on the light detected by the first photosensor, a first time of flight (TOF) value; determine, based on the light detected by the second photosensor, a second TOF value; and determine, based on the first TOF value and the second TOF value, a miniblock TOF value.

(16) The apparatus of any one of (1) to (15), wherein the miniblock includes an outer reflector surrounding the miniblock along sides of the miniblock.

(17) The apparatus of any one of (1) to (16), wherein a number of the plurality of the detector crystals is identical to a number of the photosensors.

(18) A method, including detecting, via a first photosensor in a detector block including a miniblock having a plurality of detector crystals including a first detector crystal and a second detector crystal separated by an inner reflector having a depth-dependent transparency, a first intensity of light from a gamma ray detection event incident on the first or the second detector crystal; detecting, via a second photosensor in the detector block, a second intensity of the light from the gamma ray detection event incident on the first or the second detector crystal; determining, based on the detected first intensity of the light, a first energy; determining, based on the detected second intensity of the light, a second energy; and determining, based on the first energy and the second energy, a depth of interaction (DOI) of the gamma ray detection event.

(19) The method of (18), further comprising determining, based on the light detected by the first photosensor, a first time of flight (TOF) value; determining, based on the light detected by the second photosensor, a second TOF value; and determining, based on the first TOF value and the second TOF value, a miniblock TOF value.

(20) The method of either (18) or (19), wherein the step of determining the DOI further comprises determining the DOI based on a ratio of the first energy to the second energy.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A positron emission tomography (PET) apparatus, comprising:

a detector block including a miniblock including a plurality of detector crystals, a first detector crystal and a second detector crystal of the plurality of detector crystals being separated by an inner reflector, the inner reflector having a depth-dependent transparency, and an outer reflector configured to keep scintillation light within the miniblock, a first photosensor configured to detect light from a gamma ray detection, event, a first intensity of the light detected by the first photosensor being dependent on the depth-dependent transparency of the inner reflector, and a second photosensor configured to detect the light from the gamma ray detection event, a second intensity of the light detected by the second photosensor being dependent on the depth-dependent transparency of the inner reflector; and processing circuitry configured to determine, based on the detected first intensity, a first energy, determine, based on the detected second intensity, a second energy, determine, based on the first energy and the second energy, a depth of interaction (DOD) of the gamma ray detection event, and determine a time of flight (TOF) of the gamma ray detection event within the miniblock, wherein the inner reflector includes a plurality of openings, the depth-dependent transparency of the inner reflector being determined by the plurality of openings.

2. The apparatus of claim 1, wherein the plurality of openings is divided into at least two sections along the inner reflector, a first section of the at least two sections having a different density of the plurality of openings compared to a second section of the at least two sections.

3. The apparatus of claim 2, wherein the first section of the at least two sections is disposed towards a top of the inner reflector, the top of the inner reflector being disposed opposite a bottom of the inner reflector, the bottom of the inner reflector being disposed proximal to the first photosensor or the second photosensor, the density of the plurality of openings of the first section of the at least two sections being higher than the density of the plurality of openings of the second section of the at least two sections.

4. The apparatus of claim 3, wherein an opening size for each opening of the plurality of openings is identical.

5. The apparatus of claim 1, wherein the plurality of openings is divided into at least two sections along the inner reflector, a first section of the at least two sections having a different opening size for each opening of the plurality of openings compared to a second section of the at least two sections.

6. The apparatus of claim 5, wherein the opening size for the each opening of the plurality of openings in the first section of the at least two sections is greater than the opening size for the each opening of the plurality of openings in the second section of the at least two sections.

7. The apparatus of claim 6, wherein a number of the plurality of openings in the first section of the at least two sections is identical to a number of the plurality of openings in the second section of the at least two sections.

8. The apparatus of claim 1, wherein the inner reflector includes a first section having a first uniform transparency and a second section having a second uniform transparency.

9. The apparatus of claim 8, wherein the first uniform transparency is determined by a film applied to the first section of the inner reflector and the second uniform transparency is based on a second film applied to the second section of the inner reflector.

10. The apparatus of claim 9, wherein the first section is disposed towards a top of the inner reflector, the top of the inner reflector being disposed opposite a bottom of the inner reflector, the second section being disposed towards the bottom of the inner reflector, the bottom of the inner reflector being disposed proximal to the first photosensor or the second photosensor, the first uniform transparency being higher than the second uniform transparency.

11. The apparatus of claim 8, wherein the first uniform transparency is determined by a thickness of the first section of the inner reflector and the second uniform transparency is determined by a thickness of the second section of the inner reflector.

12. The apparatus of claim 1, wherein the inner reflector includes a top and a bottom, the top of the inner reflector being disposed opposite the bottom of the inner reflector, the bottom of the inner reflector being disposed proximal to the first photosensor or the second photosensor, and a thickness of the inner reflector increases from the top of the inner reflector to the bottom of the inner reflector, the depth-dependent transparency being determined by the thickness of the inner reflector.

13. The apparatus of claim 1, wherein the processing circuitry is further configured to determine the DOI based on a ratio of the first energy to the second energy.

14. The apparatus of claim 1, wherein the processing circuitry is further configured to:

determine, based on the light detected by the first photosensor, a first TOF value;

determine, based on the light detected by the second photosensor, a second TOF value; and determine, based on the first TOF value and the second TOF value, the TOF of the gamma ray detection event within the miniblock.

15. The apparatus of claim 1, wherein the outer reflector surrounds the miniblock along sides of the miniblock.

16. The apparatus of claim 1, wherein a number of the plurality of the detector crystals is identical to a number of the photosensors.

17. A method, comprising:

detecting, via a first photosensor in a detector block including a miniblock having a plurality of detector crystals including a first detector crystal and a second detector crystal separated by an inner reflector having a depth-dependent transparency, a first intensity of light from a gamma ray detection event incident on the first detector crystal, and the miniblock including an outer reflector configured to keep scintillation light within the miniblock;

detecting, via a second photosensor in the detector block, a second intensity of the light from the gamma ray detection event incident on the second detector crystal;

determining, based on the detected first intensity of the light, a first energy;

determining, based on the detected second intensity of the light, a second energy;

determining, based on the first energy and the second energy, a depth of interaction (DOI) of the gamma ray detection event; and determining a time of flight (TOF) of the gamma ray detection event within the miniblock, wherein the inner reflector includes a plurality of openings, the depth-dependent transparency of the inner reflector being determined by the plurality of openings.

18. The method of claim 17, further comprising:

determining, based on the light detected by the first photosensor, a first TOF value;

determining, based on the light detected by the second photosensor, a second TOF value; and determining, based on the first TOF value and the second TOF value, the TOF of the gamma ray detection event within the miniblock.

19. The method of claim 17, wherein the determining the DOI further comprises determining the DOI based on a ratio of the first energy to the second energy.

* * * * *